United States Patent [19]

Ball et al.

[11] 4,290,851
[45] Sep. 22, 1981

[54] NUCLEAR REACTOR SAFETY SYSTEM

[75] Inventors: Russell M. Ball, Euclid, Ohio; Robert C. Roberts, Lynchburg, Va.

[73] Assignee: The Babcock & Wilcox Company, New Orleans, La.

[21] Appl. No.: 7,077

[22] Filed: Jan. 29, 1979

[51] Int. Cl.³ .................................................. G21C 7/00
[52] U.S. Cl. ..................................... 176/24; 176/19 R; 176/19 EC; 364/504
[58] Field of Search ............... 176/24, 19 EC, 19 R, 176/19 S; 364/504

[56] References Cited

U.S. PATENT DOCUMENTS 3,752,735  8/1973  Musick .................................. 176/24
4,133,039  1/1979  Eichenlaub ......................... 364/504

Primary Examiner—Donald P. Walsh
Attorney, Agent, or Firm—Vytas R. Matas; Joseph M. Maguire

[57] ABSTRACT

A safety system (10) for shutting down a nuclear reactor under overload conditions is provided using a series of parallel-connected computer memory type look-up tables (14a, 14b, 14c, 14d, 14e) each of which receives data on a particular reactor parameter (P, T, $\phi_T$, $\phi_B$, W) and each of which has stored therein a precalculated functional value [f(P); f(T); F($\phi_T$); f($\phi_B$); f(W)] for that parameter indicative of the percentage of maximum reactor load that the parameter contributes. The various functional values [f(P); f(T); f($\phi_T$); f($\phi_B$); f(W)] corresponding to the actual measured parameters are added together to provide a control signal (S) used to shut down the reactor under overload conditions.

9 Claims, 3 Drawing Figures

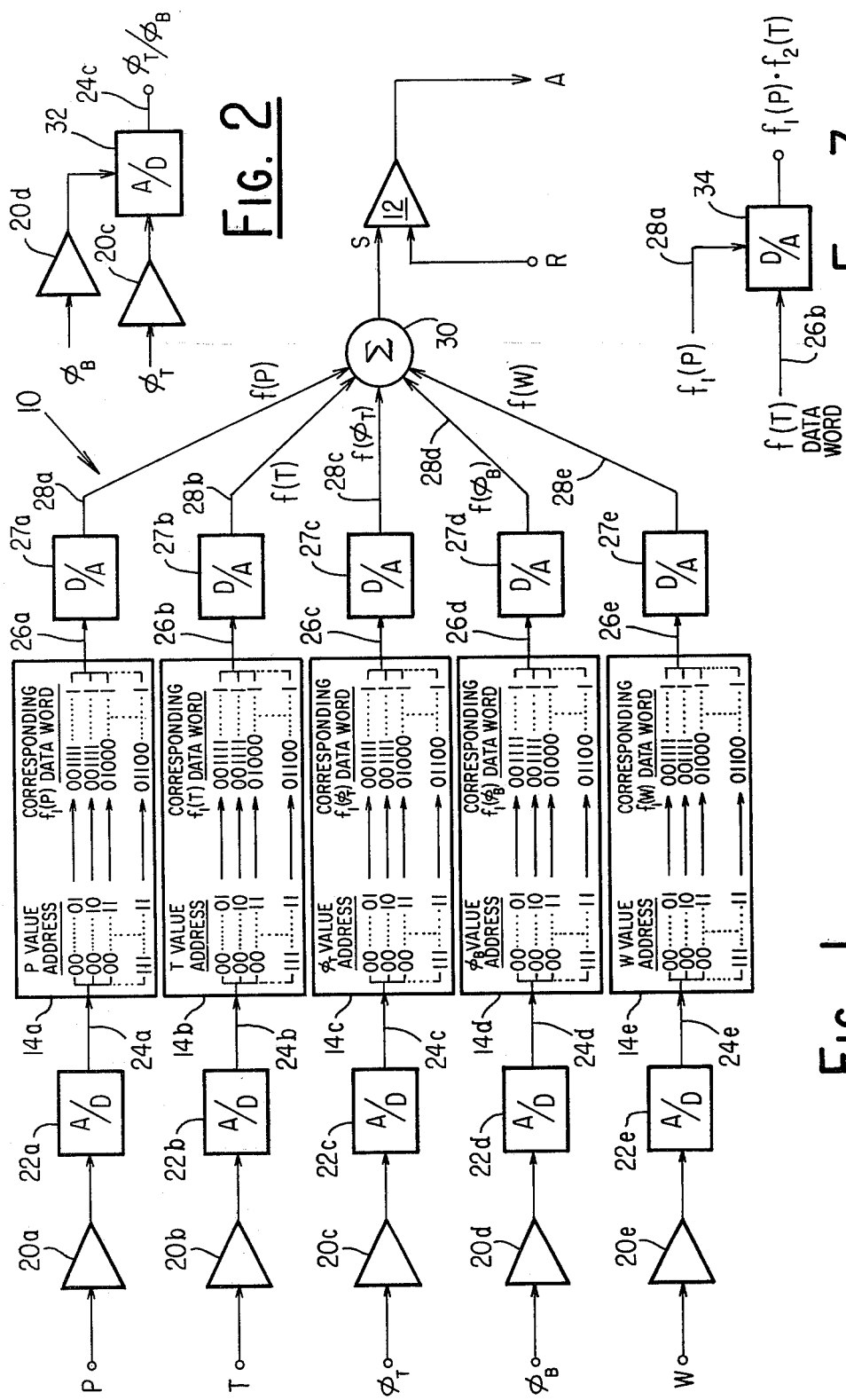

NUCLEAR REACTOR SAFETY SYSTEM

TECHNICAL FIELD

This invention relates to nuclear reactor safety systems in general and in particular to such systems having computer memory type look-up tables which accept data in parallel for continuous and repetitive translation.

BACKGROUND ART

Safety systems for nuclear reactors are known which implement digital computing modules as part of the reactor protection system. These modules implement standard digital techniques such as are used in computers. The essence of these techniques is the conversion of input signals to digital form, storage in memory, the use of a stored program to manipulate the stored data and the presentation of an output. All of these functions are essentially performed serially in the time domain by a single central computer.

The disadvantage of such prior art systems is the length of time required to do the calculations in sequence and the complexity of a program that has to manipulate in serial fashion the individual measured parameters. The normal sequence involves the taking in of data parameters to perform a series of calculations and, at the end of the calculations, to produce data which determines whether or not the reactor is in a safe operating posture.

Another problem of such prior art devices comes from the nature of digital computers operating in this fashion causing data to lose identity except for address location. Hence the tracing of programs or the debugging of faults in the system becomes time consuming and difficult. The serial computer system in order to be continuously and exhaustively tested and retested to assure proper safety control require that each of the measured parameters affecting safety have every possible value or state relative to all the other parameters. For example, if possible, reactor temperatures could have 4000 different possible values and pressure having 4000 different possible values and liquid flow 4000 possible values the number of possible input states to the serial machine would be 4000 to the third power. To exhaustively test this, even at the rate of one every tenth second, would require the order of hundreds of years. Thus, other means have been employed to assure that there are no flaws in programs for safety systems. This involves extensive review and checking by independent technical groups and regulatory authorities.

SUMMARY OF THE INVENTION

The present invention solves the problems associated with the prior art systems as well as others by providing a safety system for a nuclear reactor which uses a parallel combination of computer type look-up tables each of which receives data on a particular parameter and each of which produces the functional counterpart of that particular parameter. The various functional counterparts are then added together to form a control signal for shutting down the reactor. The functional counterparts are developed by analysis of experimental thermal and hydraulic data. The data is used to form expressions which define the safe conditions for power production in a nuclear power reactor.

A particular form for such a determination of a safe condition can be expressed as $$S = f_1(P) + f_2(T) + f_3(\phi_T) + f_4(\phi_B) + f_5(W)$$

where S is a signal which defines a power value below which the nuclear power reactor is in a safe operating condition.

$f_1(P)$ is the contribution to S from a function generator whose input is dependent on $P_1$ pressure Similarly $f_2(T)$ is the contribution to S from temperature, $f_3(\phi_T)$ is the contribution to S from the power measurements ($\phi_T$) attributable to the top half of the reactor:

$f_4(\phi_B)$ is the contribution to S from the power measurement ($\phi_B$) in the bottom half of the core:

$f_5(W)$ is the contribution to S from the flow (W) measurement of the primary coolant.

Thus, S is a summation of independent functions, each of which can be exhaustively tested for accuracy. Using the previous example of each parameter having 4000 possible states, the number of possible combination states that have to be tested becomes not 4000 to the third power but 4000 plus 4000 plus 4000 or 12,000 possible states. At the rate of testing of one per tenth second, a testing would take roughly 30 minutes. Thus, the system can be exhaustively tested with all possible values of the parameter being applied at the input and tested to determine that all functions of that parameter at an analog output are correct. This permits both input and output to be tested in analog form for each individual parameter.

An advantage of the present invention is that functions are first generated by calculations using general purpose computers of high accuracy and then storing these precomputed values of the function in memory storage systems. These functional values are accessed by an address system where each address is derived from a discrete value of the parameter. Thus, the present invention avoids the continuous repetitive calculations which form the basis of prior art systems.

This and other aspects of the present invention will be more clearly understood after a review of the following description of the preferred embodiment when considered with the drawings.

BRIEF DESCRIPTION OF THE DRAWINGS

FIG. 1 is a schematic representation of the safety system of the present invention.

FIG. 2 is an analog-to-digital converter operating in the ratio mode.

FIG. 3 is a digital-to-analog converter operating in a multiply mode.

DESCRIPTION OF THE PREFERRED EMBODIMENT

Referring now to the drawings wherein the showings are for purposes of illustrating a detailed description of a preferred embodiment and are not intended to limit the invention thereto, FIG. 1 shows a nuclear reactor safety system 10 which develops a control signal S indicative of the allowable maximum reactor power. Signal S is compared in a comparing amplifier 12 to a signal R indicative of actual reactor power. The comparing amplifier 12 will establish an alarm or shutdown signal A whenever the signal R exceeds the signal S.

The control signal S is the sum of functions of various reactor parameters as follows:

$$S = f_1(P) + f_2(T) + f_3(\phi_T) + f_4(\phi_B) + f_5(W)$$

where the functions are as previously described in the Summary of the Invention section of this application and are pre-calculated functions for each of the sensed reactor parameters, P, T, $\phi_T$, $\phi_B$, W determined from thermal hydraulic experiments which determine the maximum amount of heat which can be removed from a specific volume of an operating nuclear reactor.

The operation of storing the functions $f_1(P)$, $f_2(T)$, $f_3(\phi_T)$, $f_4(\phi_B)$, $f_5(W)$ and co-ordinating them to the proper values of the parameters P, T, $\phi_T$, $\phi_B$, and W will now be described. To accomplish the forementioned storage and co-ordination, analog-to-digital converters 22a, 22b, 22c, 22d, 22e are used. These analog-to-digital converters 22a, 22b, 22c, 22d, 22e are commercial devices such as may be obtained from Burr-Brown under the model number AD 80. These converters 22a, 22b, 22c, 22d, 22e have as inputs voltages corresponding to a particular value of respective measured reactor parameters P, T, $\phi_T$, $\phi_B$, W received from the outputs of respective amplifiers 20a, 20b, 20c, 20d, 20e. These parameter values are measured by known transducers and their values are converted to one of a number of possible digital numbers (4096 are possible in the commercial model cited) by the analog-to-digital converters 22a, 22b, 22c, 22d, 22e. The forementioned digital numbers are in a one-to-one correspondence with particular measured analog values of the parameters. For example, a parameter measurement such as a pressure of 2000.00 pounds per square inch might correspond to a digital value of 000001000000 and a pressure of 2000.25 pounds per square inch would correspond to a digital value of 000001000001. The digital value number can then be considered an address which is the input to the read-only memory of respective computer-type look-up tables 14a, 14b, 14c, 14d, 14e with each table having values for a single reactor parameter stored therein. A typical commercial memory useful for this purpose is the INTEL 2716. Associated with each digital parameter value or address is a data word which is the digital precalculated value of the respective functional values $f_1(P)$, $f_2(T)$, $f_3(\phi_T)$, $f_4(\phi_B)$, $f_5(W)$ associated with the particular respective values of parameters P, T, $\phi_T$, $\phi_B$, W. The functional values for the various data words are determined in prior calculations with highly accurate general purpose computers and are loaded into the respective read only memories of the various computer-type look-up tables 14a, 14b, 14c, 14d, 14e.

The inputs and outputs of the computer-type look-up tables 14a, 14b, 14c, 14d, 14e are conveyed along lines 24a, 24b, 24c, 24d, 24e and 26a, 26b, 26c, 26d, 26e respectively. The operations in each look-up table 14a, 14b, 14c, 14d, 14e for each of the respective parameters P, T, $\phi_T$, $\phi_B$, W are carried on simultaneously and in parallel providing precalculated data words for each measured parameter simultaneously and in parallel to each digital-to-analog converter each of which then provide a signal proportional to the functional values of the digital data words at the outputs of digital-to-analog converters 28a through 28e. These functional values $f_1(P)$, $f_2(T)$, $f_3(\phi_T)$, $f_4(\phi_B)$, $f_5(W)$ are summed by an analog summing station 30 to provide a signal S proportional to the maximum allowable power for the reactor system.

A variation on the basic FIG. 1 embodiment is shown in FIG. 2 where the use of the previously cited analog-to-digital converters 22 in FIG. 1 are modified to operate in the "ratioing" mode for the parameters $\phi_T$ and $\phi_B$. The particular reactor protection equation of these two parameters is known as the reactor offset $\theta$ and is defined as follows:

$$\theta = \phi_T/\phi_B$$

To calculate the offset $\theta$, the input signals from amplifiers 20c and 20d providing the amplified signals for $\phi_T$ and $\phi_B$ are applied to the input terminal and reference voltage terminal of a single analog-to-digital converter 32. As is known to those skilled in the art, the output signal from A/D converter 32 is proportional to the ratio of the input signals $\phi_T/\phi_B$ since the output is directly proportional to the first input $\phi_T$ and inversely proportional to the reference terminal input $\phi_B$. Thus the ratio $\phi_T/\phi_B$ may be directly used as outputs from the converter 32 in calculating the offset $\theta$.

Some reactor protection equations require that the safe operating power remain below a value V defined by the product of two functions, $$V = f(A) \times f(B).$$

An example of the need for this form is where f(A) is the equation for controlling boiling in the reactor and f(B) is a term for correcting this value for the power measurement error caused, for example, by absorption of neutrons where neutron flux is used as a measure of power. A further variation on the FIG. 1 embodiment is shown in FIG. 3 which would provide for this product form by using the digital-to-analog converter 34 in the "multiplying form". As shown in FIG. 3, the output of the D/A converter 34 is the product of a first signal 26b and a second signal 28a. The first signal 26b is in digital form consisting of a digital data word representing a first variable or function of a variable such as f(T). The second signal 28a is an analog signal of a variable such as f(P) and is connected to the second input to the digital-to-analog converter 34. This second input f(P) is often referred to by those knowledgeable in the art as the reference input. As is known, the output from the D/A converter 34 in such a connection mode would yield a composite multiplied function $f_1(P) \times f_2(T)$.

As a further embodiment of the multiplication use of the FIG. 3 embodiment, the converter 27e which determines the address for the look-up table 14e forming the function of flow, f(W), can use information on the number of pumps operating in the system to select the proper address. In a transition period when the number of operating pumps changes, the address can be changed by changing, with pulses separated by a fixed time interval, the contents of a counter forming the address.

Clearly, various other improvements and modifications will occur to those skilled in the art upon the reading of this specification. All such improvements and modifications have been deleted herein for the sake of conciseness and readability but are intended to be within the scope of the following claims.

We claim:
1. A safety system for a nuclear reactor comprising:
a series of transducers for measuring various different parameters of the nuclear reactor's operation;
a series of parallel-connected computer-type look-up tables each individually connected to each one of the transducers, each look-up table containing a precalculated function of that parameter measured by said transducer connected to that look-up table indicative of percentage of full reactor load contributed by that parameter for a series of measured parameter values and outputing said precalculated function in response to the parameter signal measured by said transducer connected thereto;

a summing station for receiving all of the outputs of the respective computing stations and summing them up to establish a control signal indicative of percentage of allowable full power reactor operation.

2. A safety system as set forth in claim 1 including a comparing station for comparing the control signal from said summing station with a power signal to establish an alarm signal whenever said power signal exceeds said control signal.

3. A safety system as set forth in claim 2 including a series of analog-to-digital converters mounted between each transducer and its respective computer-type look-up tables for converting the analog signal of each transducer to a digital signal for the computer-type look-up tables.

4. A safety system as set forth in claim 1 wherein the analog parameter signals from a pair of transducers are applied as inputs to one analog-to-digital converter to provide a digital output signal therefrom which is a ratio of the two parameters.

5. A safety system as set forth in claim 4 wherein the pair of parameters are $\phi_T$ and $\phi_B$ and their ratio is used to determine the offset of a nuclear reactor.

6. A safety system as set forth in claim 3 including a series of digital-to-analog converters individually mounted between said summing station and each of said computing stations to convert the digital output signal of said computing stations to an analog signal for the summing station.

7. A safety system as set forth in claim 6 wherein each of the computer-type look-up tables has a digital parameter value stored therein and a corresponding precalculated functional value for each stored parameter value representative of the percentage of full power contribution of the respective parameter.

8. A safety system as set forth in claim 7 wherein the parameters of the nuclear reactor sensed by respective transducers include reactor pressure, temperature, cooling fluid flow, neutron flux, escaping from the upper portion of the reactor and neutron flux escaping from the lower portion of the reactor.

9. A safety system as set forth in claim 6 wherein one of said digital-to-analog converters has a digital data word representing a parameter function as one input and an analog parameter function as the second input to provide an analog output which is the product of the two parameter functions.

* * * * *